(12) United States Patent
Kim et al.

(10) Patent No.: US 7,142,368 B2
(45) Date of Patent: Nov. 28, 2006

(54) AUTO-FOCUSING OPTICAL SYSTEM FOR CAMERA MODULE

(75) Inventors: Tae Young Kim, Seoul (KR); Young Jun Kim, Kyungki-do (KR); Young Joo Jo, Kyungki-do (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 118 days.

(21) Appl. No.: 11/007,205

(22) Filed: Dec. 9, 2004

(65) Prior Publication Data

US 2006/0056042 A1   Mar. 16, 2006

(30) Foreign Application Priority Data

Sep. 1, 2004   (KR) .................. 10-2004-0069726

(51) Int. Cl.
  *G02B 3/14*   (2006.01)
  *G02B 13/18*   (2006.01)
  *G02B 13/04*   (2006.01)

(52) U.S. Cl. .................. 359/666; 359/716; 359/753

(58) Field of Classification Search ........ 359/665–667, 359/716, 753
See application file for complete search history.

(56) References Cited

U.S. PATENT DOCUMENTS 6,417,972 B1   7/2002   Chung et al.

2001/0017985 A1   8/2001   Tsuboi et al
2006/0028734 A1*   2/2006   Kuiper et al. ............... 359/676

FOREIGN PATENT DOCUMENTS

| WO | WO 03/069380 A1 | 8/2003 |
| WO | 2004/038480 A1 | 5/2004 |
| WO | 2005/088354 A1 | 9/2005 |

OTHER PUBLICATIONS

S. Kuiper & B. J. W. Hendriks, Variable-focus Liquid Lens for Miniature Cameras, Applied Physics Letters, Aug. 16, 2004, vol. 85, No. 7, pp. 1128-1130.
Office Action from the German Patent Office mailed Apr. 26, 2006 with English Translation.

* cited by examiner

*Primary Examiner*—Scott J. Sugarman
(74) *Attorney, Agent, or Firm*—Lowe Hauptman & Berner, LLP.

(57) ABSTRACT

The present invention relates to an auto-focusing optical system, and more particularly, to an auto-focusing optical system for a camera module, capable of obtaining a high resolution in a small size using a liquid lens whose curvature is varied depending on an applied voltage. In the auto-focusing optical system, a first lens group has a liquid lens whose curvature is varied and having a plus optical power, a second lens group has a plus optical power, and a third lens group has a minus optical power. Thanks to an auto-focusing optical system including a liquid lens according to the present invention, not only a manufacturing in a small size is possibly realized but also a high resolution can be obtained, and power consumption is small.

8 Claims, 8 Drawing Sheets

(a)

(b)

(c)

AUTO-FOCUSING OPTICAL SYSTEM FOR CAMERA MODULE

RELATED APPLICATION

The present application is based on, and claims priority from, Korean Application Number 2004-0069726, filed Sep. 1, 2004, the disclosure of which is hereby incorporated by reference herein in its entirety.

BACKGROUND OF THE INVENTION

1. Field of the Invention

The present invention relates to an auto-focusing optical system, and more particularly, to an auto-focusing optical system for a camera module, capable of obtaining a high resolution in a small size using a liquid lens whose curvature is varied depending on an applied voltage.

2. Description of the Related Art

Generally, a camera has a plurality of lenses and is configured to adjust an optical focal length by moving each lens to change a relative distance between lenses. Recently, a cellular phone with a built-in camera has emerged and accordingly it has become possible to photograph a still image or a moving picture using the cellular phone. Further, a recent trend is that performance of a camera is getting gradually improved in photography of high resolution and quality.

FIG. 1 is a perspective view of a conventional camera module which does not have a focusing function.

Referring to FIG. 1, the conventional camera module is configured to include an image sensor 54, a filter assembled to a lower side of a housing 51, and a plurality of lenses mounted inside a lens barrel 52.

The lens barrel 52 is fixed in the housing 51 using epoxy after a focal length of a lens array 53 is adjusted to the image sensor 54 using screw threads formed on an inner periphery of the housing 51 and an outer periphery of the lens barrel 52.

However, since it is impossible to focus at a specific distance in such a fixed focusing type, there is a limitation in sharpness of image quality.

Therefore, a focusing function is indispensably required for a camera module of more than mega pixels.

For that purpose, a necessity for application of a camera module having an auto-focusing unit, a close-shot unit, and an optical zoom unit on a cellular phone has emerged, but there has been difficulty in mounting a camera module manufactured according to the related art on a small-sized cellular phone.

That is, the camera module of the related art has used a DC (direct current) motor as an operating source, for performing a focusing and/or a zooming by changing a relative distance between an image sensor and a lens. However, according to the camera module of the related art, since a plurality of reduction gears are connected together so that a relative distance between lenses may be changed, it is difficult to accurately control a position of a lens so as to precisely perform a focusing due to reduction in response time and deviation in rotational speed. Further, since the camera module is big in its size and complicated in its structure, it is difficult to realize an auto-focusing function at an extremely limited space in an inside of a small-sized optical apparatus such as a cellular phone.

Further, since a plurality of lenses is used to obtain a high resolution, manufacturing cost is increased and mechanical operation is required, which increases power consumption.

In the meantime, PCT international publication No. WO 03/069380 discloses a variable focus lens.

FIG. 2 is a schematic, cross-sectional view of a variable focus lens suggested as an embodiment by WO 03/069380.

Referring to FIG. 2, the variable focus lens includes: a fluid chamber 65 of a cylinder shape having a cylinder wall, and containing a first and a second fluids A and B having different indexes of refraction, respectively, in which the first and second fluids A and B are and not mixed with each other, and contact each other through a meniscus 74; a fluid contact layer 70 arranged in an inside of the cylinder wall; a first electrode 62 separated from the first and the second fluids A and B by the fluid contact layer 70; and a second electrode 72 for activating the second fluid B.

Here, the first electrode 62 is of a cylindrical shape and coated by an insulating layer 68, and made of metal material, and the second electrode 72 is arranged on one side of the fluid chamber 65.

Further, a transparent front element 64 and a transparent rear element 66 constitute a cover part of the fluid chamber 65 for accommodating the two fluids.

Operation of the variable focus lens having the above-described construction will now be described in the following.

If a voltage is not applied between the first and the second electrodes 62 and 72, the fluid contact layer 70 has a high wettability for the first fluid A rather than the second fluid B.

If a voltage is applied between the first and the second electrodes 62 and 72, wettability for the second fluid B is changed due to electrowetting, and contact angles Q1, Q2, Q3 of the meniscus 74 are changed as shown in FIG. 2.

Therefore, a shape of the meniscus is changed depending on an applied voltage and a focusing is performed using the change generated in the shape of the meniscus.

That is, as shown in FIGS. 2A, 2B, and 2C, an angle between the meniscus 74 and the fluid contact layer 70, measured by the first fluid A is changed into about 140°, 100°, 60° depending on intensities of the applied voltage.

Here, FIGS. 2A, 2B, 2C represent arrangements in cases of a high negative power, a low negative power, and a positive power, respectively.

As described above, the variable focus lens using the fluid (referred to as 'liquid lens') has an advantage in manufacturing a small-sized product compared to the related art in which a focusing is performed using mechanical operation of a lens.

However, since a resolution is limited to about three hundred thousand pixels and a high resolution cannot be obtained in case of using an only liquid lens, there is limitation in applying the liquid lens to a current camera module of mega-pixel class.

To solve such problems, an auto-focusing optical system that can be manufactured in a small size, is highly required.

SUMMARY OF THE INVENTION

Accordingly, the present invention is directed to an auto-focusing optical system for a camera module that substantially obviates one or more problems due to limitations and disadvantages of the related art.

An object of the present invention is to provide an auto-focusing optical system for a camera module, capable of being manufactured in a small size and obtaining a high resolution.

Another object of the present invention is to provide an auto-focusing optical system for a camera module, capable of maximizing an efficiency of an optical system and shortening a length of the whole optical system by concentrating a power in case a very small-sized camera module such as a camera phone is required.

Further another object of the present invention is to provide an auto-focusing optical system for realizing low power consumption.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an auto-focusing optical system includes, sequentially from an object: a first lens group having a plus optical power, the first lens group including a liquid lens in which a curvature of a boundary surface formed between different liquids included in an inside is varied depending on an applied voltage so that the boundary surface performs a function of a lens' surface, and an aspherical lens having at least one aspherical refraction surface; a second lens group having a plus optical power, and including an aspherical lens having at least one aspherical refraction surface; a third lens group a minus optical power, and including an aspherical lens having at least one aspherical refraction surface, and wherein the curvature of the boundary surface of the liquid lens is varied so that an auto-focusing is performed.

In the auto-focusing optical system, a refraction power of the liquid lens satisfies the following Equation 1:

$$-7 < D < 35 \qquad \text{Equation 1,}$$

wherein D is refraction power of a surface of the liquid lens whose curvature is varied (unit: diopter).

Further, in the auto-focusing optical system an optical axial direction measure of the whole lens group satisfies the following Equation 2:

$$oal/f < 2.0 \qquad \text{Equation 2,}$$

wherein oal is distance from an aperture stop up to an image plane, and f is composite focal length of the whole lens.

In the auto-focusing optical system, a power of the first lens group satisfies the following Equation 3:

$$0.85 < f1/f < 1.5 \qquad \text{Equation 3,}$$

wherein f1 is composite focal length of the first lens group.

Further, in the auto-focusing optical system, a power of the third lens group satisfies the following Equation 4:

$$2.0 < |f3|/f < 5.5 \qquad \text{Equation 4,}$$

wherein f3 is composite focal length of the third lens group.

Further, the first lens group includes, sequentially from an object: a first lens that corresponds to a cover surface of the liquid lens; a second lens including the liquid lens; and a third lens that corresponds to an upper cover surface of the liquid lens. In the meantime, the aperture stop may be arranged most closely to an object side in the auto-focusing optical system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 4:
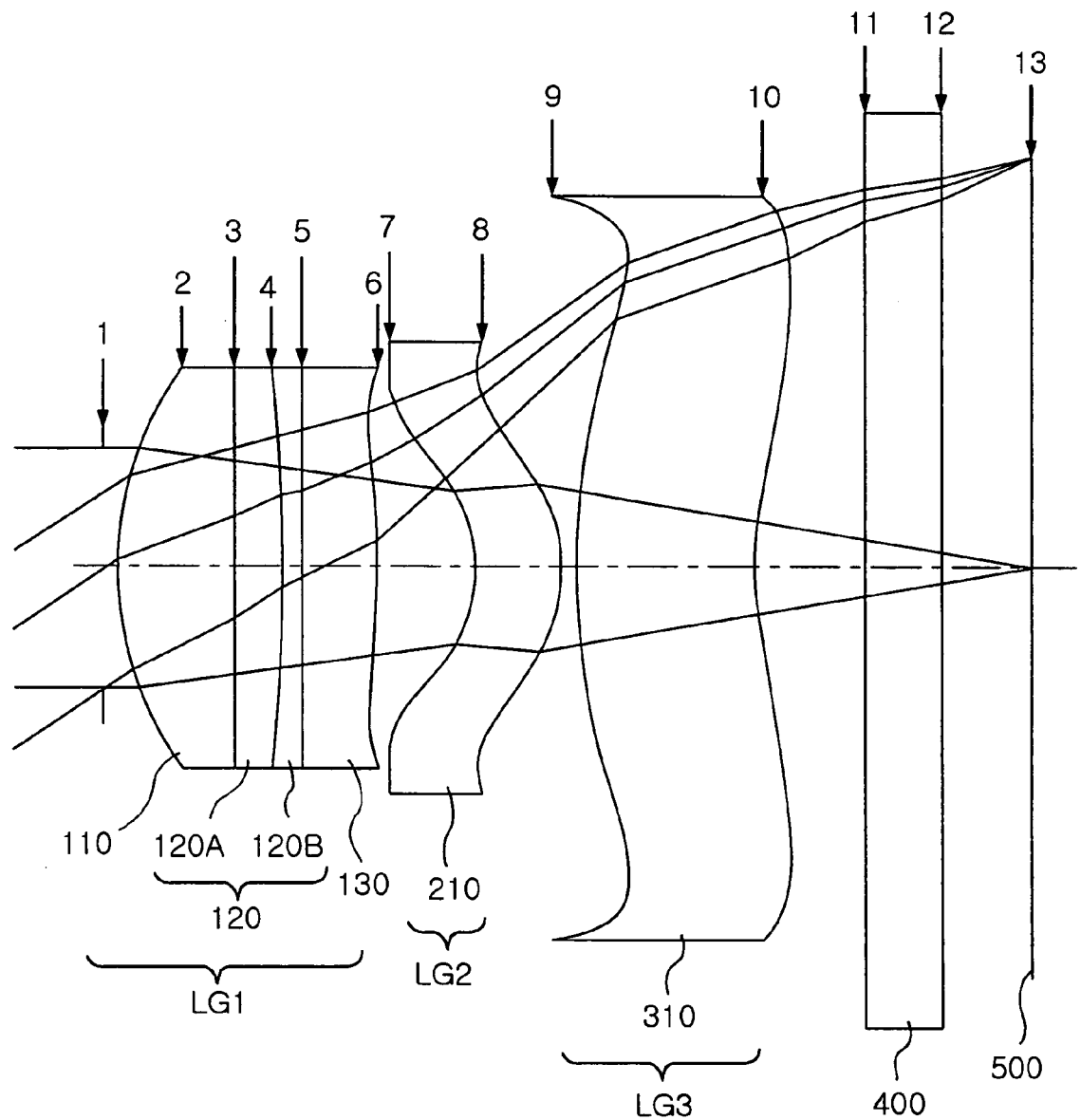
FIG. 4 is a view illustrating a combination of lens in an optical system according to an embodiment of the present invention.

FIG. 4 is a view illustrating a combination of lens in an optical system according to an embodiment of the present invention. In FIG. 4, the thickness, size, and shape of a lens have been exaggerated more or less for convenience in explanation, and particularly, spherical and aspherical shapes illustrated in FIG. 4 have been given for an embodiment purpose only, and not limited to that specific shape.

Referring to FIG. 4, an auto-focusing optical system according to an embodiment of the present invention includes, sequentially from an object side: an aperture stop 1 arranged most closely to an object side for removing unnecessary light; a first lens group (LG1) of a plus optical power and including a liquid lens and an aspherical lens having at least one aspherical refraction surface; a second lens group (LG2) having a plus optical power and including an aspherical lens having at least one aspherical refraction surface; and a third lens group (LG3) having a minus optical power and including an aspherical lens having at least one aspherical refraction.

Here, it is possible to minimize a defocus amount such that curvature variation in an inside of the first lens group 1 for performing an auto-focusing according to a position change of an object influences the whole field, by arranging the aperture 1 of the optical system in front of the first lens group LG1, where curvature variation occurs.

In the meantime, the first lens group LG1 has, sequentially from an object side: a first lens 110 having a plus refraction power, and including a convex surface 2 facing an object side and a flat image plane 3; a second lens 120 including a flat surface 3 facing an object side, a flat image plane 5 and a surface 4 positioned between the surface 3 and having a variable curvature; and a third lens 130 having a minus refraction power, and including a flat surface 5 facing an object side and a concave image plane 6.

The second lens 120 is a liquid lens in which a curvature of the boundary surface 4 formed between different liquids included in an inside is varied depending on an applied voltage so that the boundary surface 4 performs a function of a lens' surface.

Figure 1:
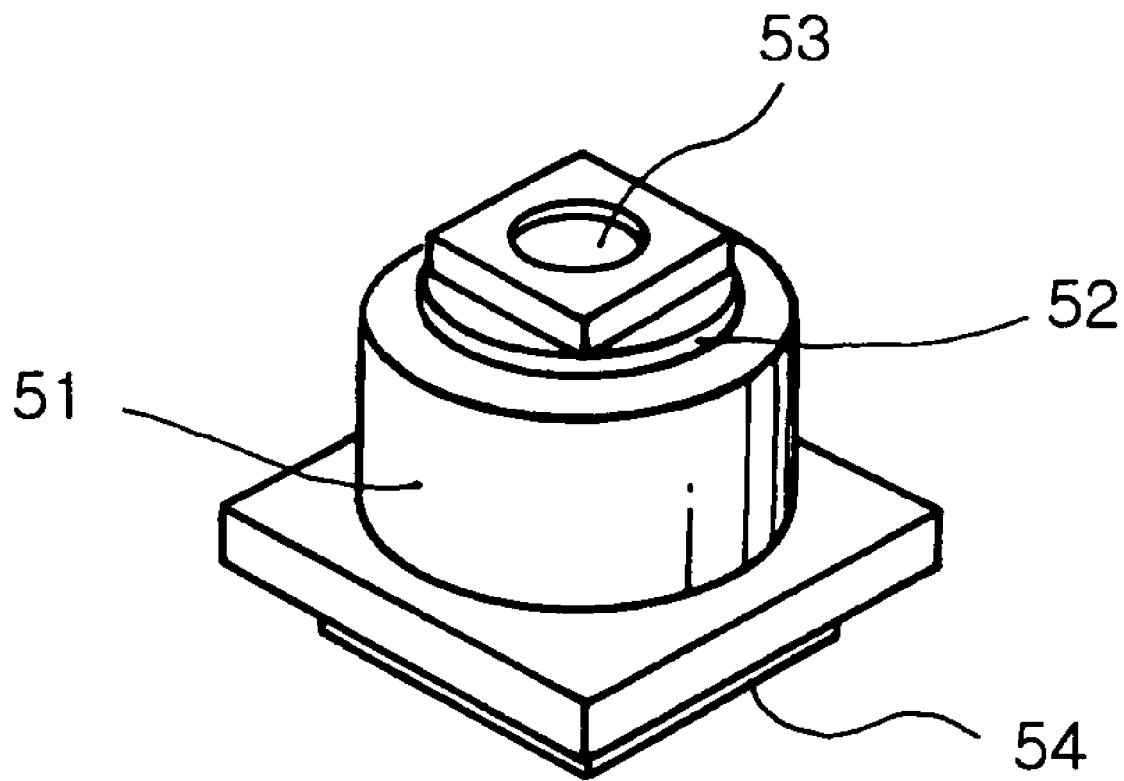
FIG. 1 is a perspective view of the conventional camera module which does not have a focus adjusting function.
Figure 2:
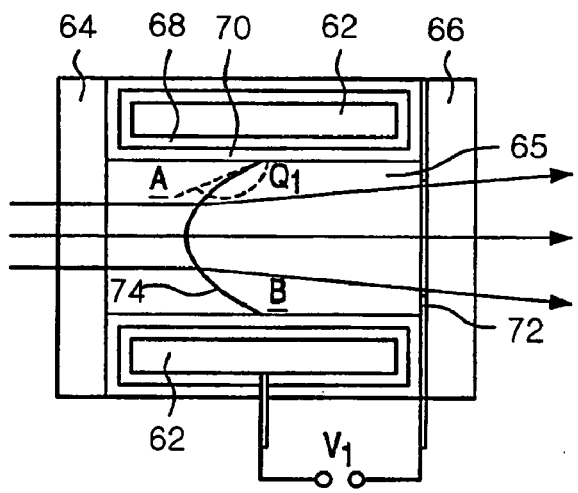
FIGS. 2A, 2B and 2C are schematic, cross-sectional views of a variable focus lens of the related art.
Figure 2:
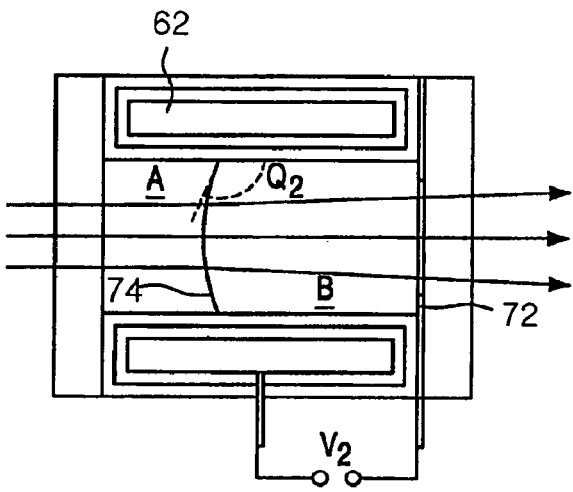
Figure 2:
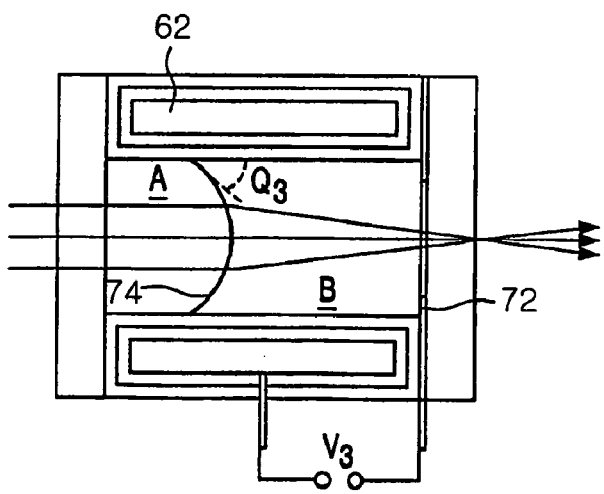

That is, the second lens 120 including the liquid lens is divided into two lens 120A and 120B with the boundary surface 4 interposed therein, and as shown in FIG. 2, the curvature of the boundary surface 4 is varied depending on an applied voltage, so that an auto-focusing is performed.

At this point, the first lens 110 and the third lens 130 may form a cover part of the second lens 120.

It is possible to perform an auto-focusing depending on an applied voltage by introducing the second lens 120, which is a liquid lens.

In the meantime, it is possible to maximize a power of an optical system and shorten a length of the whole optical system by adding the liquid lens to the first lens group LG1 and enhancing the first lens group's power as described below. Therefore, an auto-focusing is possibly achieved in a small-sized camera module.

Further, the second lens group LG2 includes a fifth lens 210 having a plus refraction power and whose image plane 8 is convex, and the third lens group LG3 includes a sixth lens 310 having a minus refraction power and whose image plane 10 is concave.

In the meantime, a solid photographing element (photoelectric transformation element) having a glass block 400 installed in viewpoint of a design, which corresponds to an optical low-pass filter, a color filter, a face plate, and a photosensitive surface 500 including a CCD (charge coupled device) sensor or a CMOS (complementary metal oxide semiconductor) sensor, for receiving an image formed by a lens, is provided to a rear side of the lens.

The optical system according to an embodiment of the present invention having the above-described characteristics satisfies the following Equation 1:

$$-7<D<35 \qquad \text{Equation 1,}$$

wherein D represents a refraction power of a surface 4 whose curvature is varied automatically. The unit is diopter.

The above Equation 1 is a formula for a power of an optical system.

If the optical system does not satisfy the Equation 1 and goes beyond the upper limit, power arrangements of the second lens group LG2 and the third lens group LG3 are changed and aberration characteristics for a close shot is deteriorated.

$$oal/f<2.0 \qquad \text{Equation 2}$$

Here, oal represents an overall length from an aperture stop surface 1 to an image plane 13, and f represents a focal length of the whole optical system.

The Equation 2 prescribes a length of the whole lens (length of an optical system) and is a Equation for manufacturing in a small size.

That is, if an optical system exceeds the upper limit of the Equation 2, it is advantageous in viewpoint of aberration correction but a length of an optical system becomes too long and the optical system cannot be mounted on a small-sized optical apparatus such as a camera phone or a PDA (personal digital assistant).

$$0.85<f1/f<1.5 \qquad \text{Equation 3}$$

Here, f1 represents a focal length of the first lens group LG1 and f represents a focal length of the whole optical system.

The Equation 3 is a formula for a power of the first lens group LG1. According to the Equation 3, a power of the first lens group LG1, which is a curvature variation part, is made similar to the whole power so that an aspherical aberration may be effectively corrected.

If f1 becomes large by exceeding the upper limit, powers of the second and the third lens groups LG2 and LG3 inevitably become large and chromatic aberration also becomes large. On the contrary, if f1 becomes small by exceeding the lower limit, the power of the first lens group LG1 becomes huge and a spherical aberration and a comatic aberration become large. Further, a curvature radius of a lens' surface constituting the first lens group LG1 becomes small, which makes process difficult.

$$2.0<|f3|/f<5.5 \qquad \text{Equation 4}$$

Here, f3 represents a focal length of the third lens group LG3 and f represents a focal length of the whole optical system.

The Equation 4 is a formula for a power of the third lens group LG3. Since the first lens group LG1 and the second lens group LG2 have a plus power, the third lens group LG3 is given a minus power so that an angle of a ray provided to an image plane becomes small.

If the value exceeds the upper limit and the power becomes small, telephoto ratio of the whole lens is deteriorated and manufacturing in a small size becomes difficult and if the value exceeds the lower limit, it is advantageous in manufacturing in a small size, but it is disadvantageous in viewpoint of telecentricity in the vicinity and a distortion aberration.

As described above, it is possible to maximize an efficiency of an optical system and shorten a length of the whole optical system by adding the liquid lens to the first lens group LG1 and enhancing the first lens group's power. Therefore, the optical system can be readily applied to a very small-sized camera module such as a camera phone.

In the meantime, a formula for curvature radius of each lens group is given as following Equation 5:

$$0.3<r2/f<0.8 \qquad \text{Equation 5,}$$

wherein r2 represents a curvature radius of a second surface and f represents a focal length of the whole optical system.

The Equation 5 is a factor for determining a shape of the first lens group LG1 and basically corrects a spherical aberration and a comatic aberration. If the value exceeds the upper limit or the lower limit, a spherical aberration and distortion aberration characteristics of an optical system are deteriorated so that correction in the second lens group LG2 and the third lens group LG3 cannot be performed.

$$1.0<|r6|/f<0.8 \qquad \text{Equation 6}$$

Here, r6 represents a curvature radius of a sixth surface and f represents a focal length of the whole optical system.

The Equation 6 is also a factor for determining a shape of a lens. If the value exceeds the upper limit or the lower limit, a spherical aberration and astigmatism characteristics of an optical system are deteriorated so that correction in the second lens group LG2 and the third lens group LG3 cannot be performed.

$$0.15<|r7|/f<1.0 \qquad \text{Equation 7}$$

Here, r7 represents a curvature radius of a seventh surface and f represents a focal length of the whole optical system.

The Equation 7 is a factor for determining a shape of the second lens group LG2. If the value exceeds the upper limit or the lower limit, a spherical aberration and a distortion aberration characteristics of an optical system are deteriorated.

Further, if the value exceeds the upper limit, the angle of off-axis principle rays becomes too small and correction cannot be made in the third lens group LG3, so that telecentricity is deteriorated. If the value exceeds the lower limit, it is advantageous in viewpoint of telecentricity but off-axis coma flare increases largely and optical performance deteriorates.

$$0.4 < |r10/f| < 3.0 \quad \text{Equation 8}$$

Here, r10 represents a curvature radius of a tenth surface and f represents a focal length of the whole optical system.

The Equation 8 is a formula for determining the shape of an area in the vicinity of an axial light bundle of the third lens group LG3 and means that a minus power is given to a rear side.

If the value exceeds the upper limit in the Equation 8, a minus power in the rear side becomes small and manufacturing in a small size gets difficult. On the contrary, if the value exceeds the lower limit, a difference in a shape at the vicinity becomes large and performance variation between a center and the vicinity becomes large, and an incident angle to a photographing surface becomes large, which is not preferable.

Further, if the value exceeds the upper and the lower limits, a distortion aberration and astigmatism characteristics are deteriorated, so that correction cannot be made.

An embodiment of the present invention realized so as to satisfy the above-described conditions 1 through 8 will now be described in the following.

F-number (FNO) of an auto-focus lens according to an embodiment of the present invention is 2.6, a focal length is 4.7 mm, and a field angle (2ω) is 64°.

Embodiment values of each lens constituting a lens according to an embodiment of the present invention are described in table 1.

Here, f represents a focal length, r represents a curvature radius of a lens' surface, d represents a thickness of a lens or a distance between lens' surfaces, and nd represents an index of refraction. In the meantime, unit for a length is mm.

TABLE 1

| Surface No. | Curvature radius(r) | Thickness or distance(t) | Index of refraction(nd) |
|---|---|---|---|
| 1 | ∞ | 0.100000 | |
| *2 | 2.73318 | 0.850000 | 1.530 |
| 3 | ∞ | 0.357000 | 1.350 |
| ※4 | −14.10900 | 0.143000 | 1.450 |
| 5 | ∞ | 0.550000 | 1.530 |
| *6 | −21.51935 | 0.748070 | |
| *7 | −0.96679 | 0.650000 | 1.608 |
| *8 | −1.04457 | 0.100000 | |
| *9 | 4.05002 | 1.320015 | 1.530 |
| *10 | 2.24942 | 0.822980 | |
| 11 | ∞ | 0.550000 | 1.517 |
| 12 | ∞ | 0.677388 | |
| Image plane | ∞ | 0.000000 | |

In table 1, ※ represents a surface whose curvature is varied and curvature radii of the fourth surface according to a distance from an object are given by table 2 as follows.

TABLE 2

| Distance from object | Curvature radius of 4th surface |
|---|---|
| Infinity (∞) | −14.109 |
| 50 cm | −27.959 |
| 10 cm | 31.368 |

As shown in table 2, since an auto-focusing is performed by a curvature radius variation of a liquid lens in case the liquid lens is used, an ultra-close shot can be taken. Hence, there are advantages that a finger print or a letter can be recognized using a camera module mounted on a cellular phone.

That is, code service (service in which if a barcode-like special letter on a newspaper and a magazine is read by a camera of a cellular phone, related information is displayed on the cellular phone) can be developed even more, and further, a scanner function can be realized.

In the meantime, * represents an aspherical surface and a formula for an aspherical coefficient is given by formula 1 as follows:

$$Z = \frac{cY^2}{1 + \sqrt{1-(1+K)c^2Y^2}} + AY^2 + BY^2 + DY^2 + DY^2 + EY^2 + FY^2 + \ldots \quad \text{Formula 1}$$

Z: distance from apex of lens to optical axis
Y: distance in direction vertical to optical axis
c: inverse number (1/R) of curvature radius at lens' apex
K: Conic constant
A, B, C, D, E, F: aspherical coefficients Each aspherical coefficient according to an embodiment of the present invention, computed by the formula 1 is given by table 3 as follows. In the present embodiment illustrated in FIG. 4, the surface 2 facing an object of the first lens 110 of the first lens group LG1, the image plane 6 of the third lens 130 of the first lens group LG1, the surface 7 facing an object and an image plane 8 of the fourth lens 210 of the second lens group LG2, and the surface 9 facing an object and an image plane 10 of the fifth lens 310 of the third lens group LG3 are all aspherical surfaces.

TABLE 3A

| | Aspherical coefficient of 2nd surface | Aspherical coefficient of 6th surface | Aspherical coefficient of 7th surface |
|---|---|---|---|
| K | 0.36587438 | −0.04646980 | −1.03434747 |
| A | −2.045245 | 0.000000 | −0.848127 |
| B | 7.74796E−03 | −1.82173E−02 | 3.06269E−02 |
| C | 8.44950E−03 | 1.19808E−02 | 8.01190E−03 |
| D | −1.29965E−02 | −2.67056E−02 | 6.48158E−02 |
| E | 8.14267E−03 | 2.54854E−02 | −2.95118E−02 |
| F | −1.42054E−03 | −5.82323E−03 | 3.69651E−03 |

TABLE 3B

| | Aspherical coefficient of 8th surface | Aspherical coefficient of 9th surface | Aspherical coefficient of 10th surface |
|---|---|---|---|
| K | −0.95733078 | 0.24691222 | 0.44455811 |
| A | −2.483518 | −4.816340 | −11.908208 |
| B | −1.09113E−01 | −2.09989E−02 | −3.38090E−02 |

TABLE 3B-continued

| | Aspherical coefficient of 8th surface | Aspherical coefficient of 9th surface | Aspherical coefficient of 10th surface |
|---|---|---|---|
| C | 5.38957E−02 | 1.36530E−02 | 1.33252E−02 |
| D | 1.30828E−02 | −4.36719E−03 | −2.78504E−03 |
| E | −6.80272E−03 | 6.59467E−04 | 2.79674E−04 |
| F | 5.75392E−04 | −3.97278E−05 | −1.16410E−05 |

Figure 5:
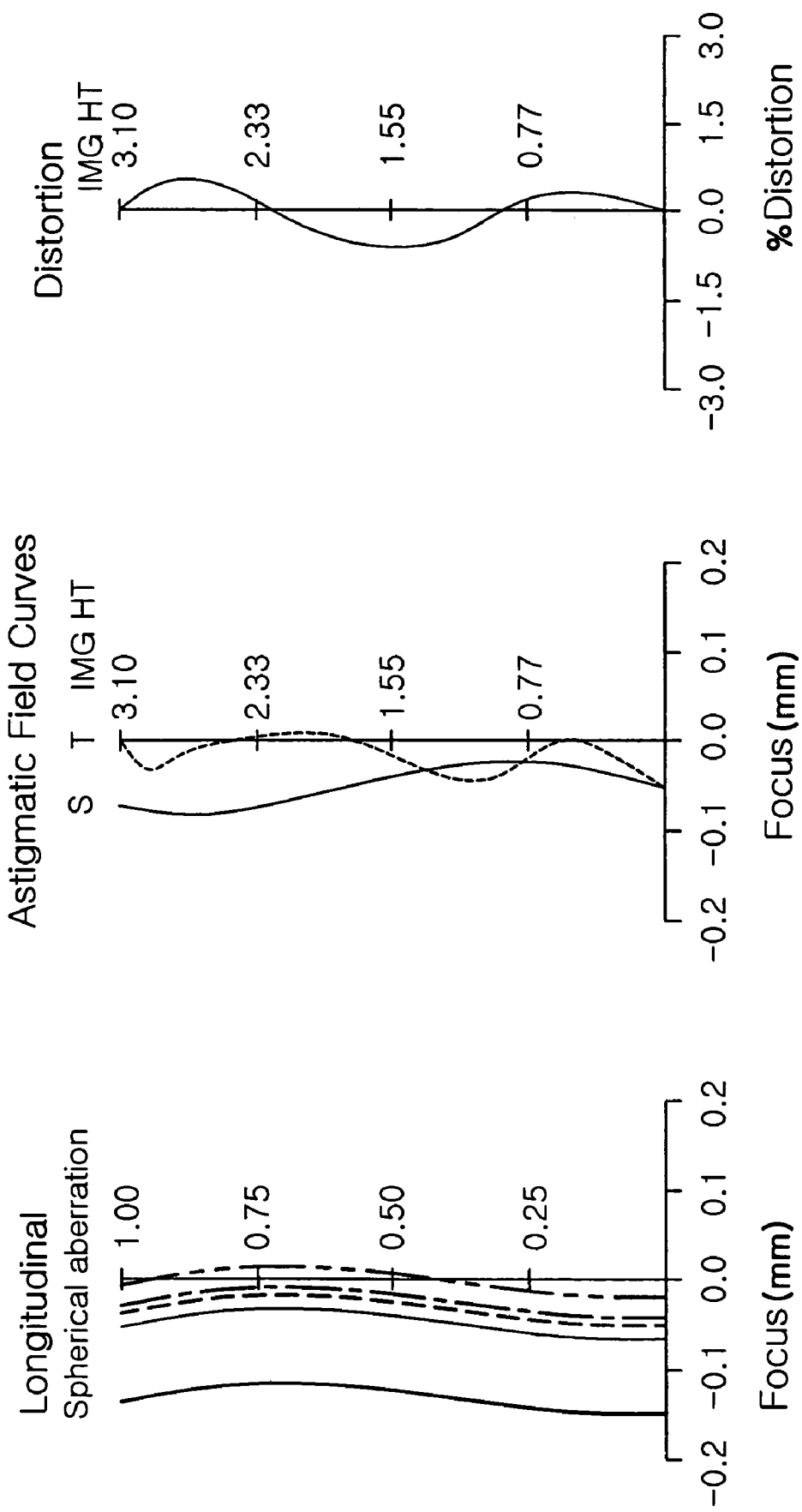
FIG. 5 is a graph illustrating spherical aberration, astigmatism, and distortion characteristics of an optical system according to an embodiment of the present invention.

FIG. 5 illustrates spherical aberration, astigmatism, and distortion characteristics according to an embodiment of the present invention having such embodiment values.

Figure 6A:
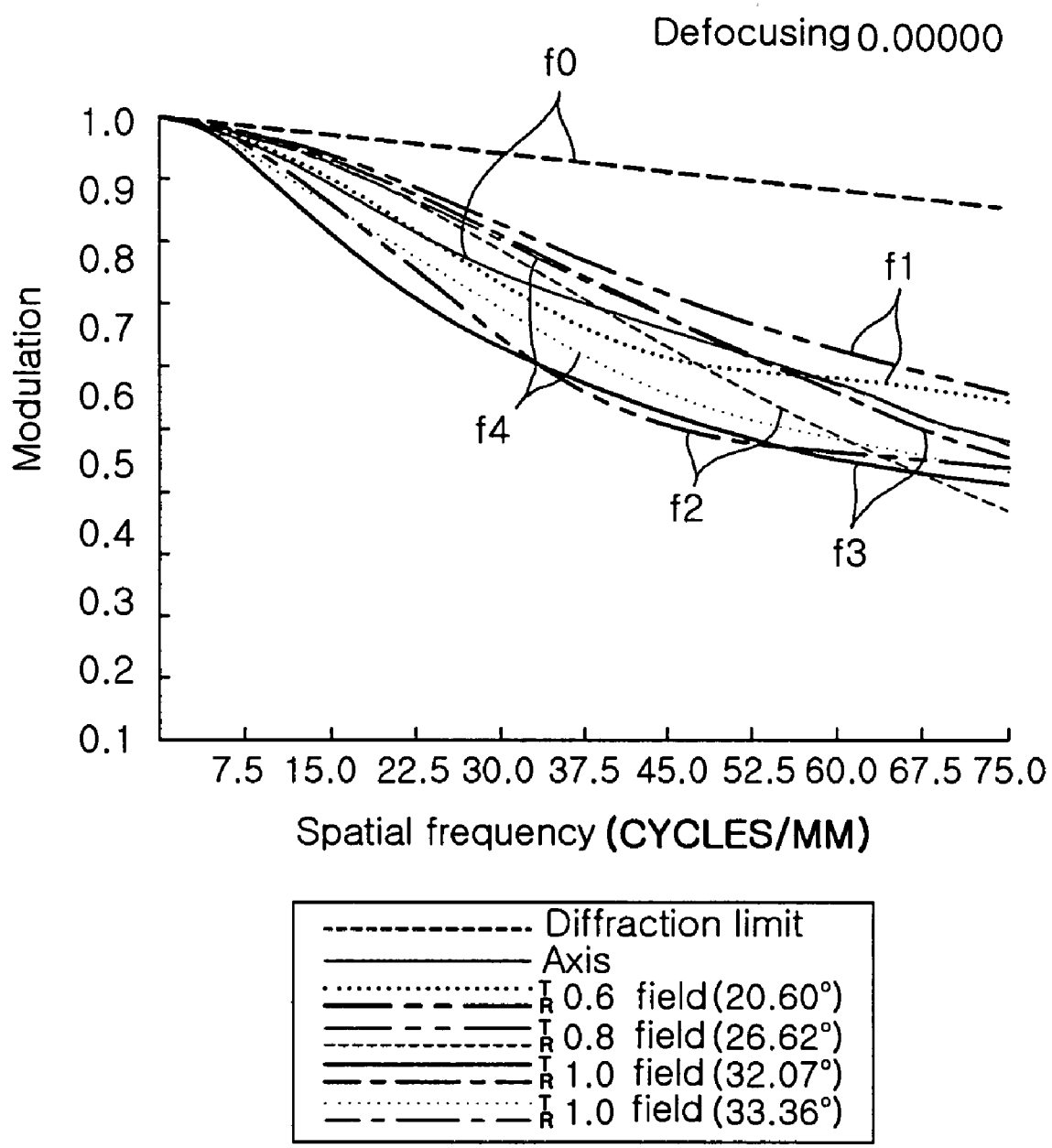
FIGS. 6A and 6B are graphs illustrating MTF characteristics for a long distance and a short distance in an optical system according to an embodiment of the present invention.
Figure 6B:
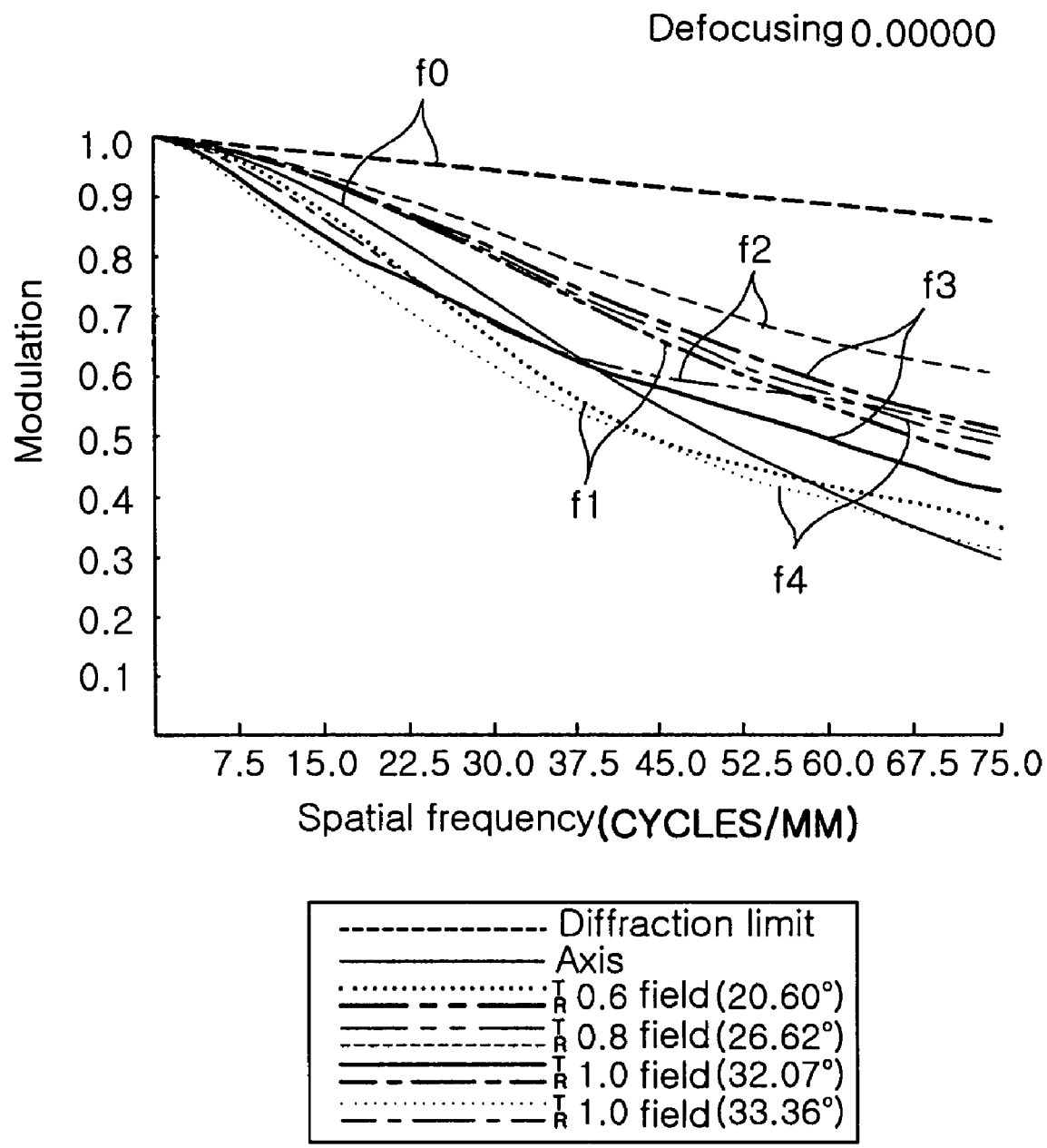

In the meantime, FIG. 6 illustrates MTF (modulation transfer function) characteristics of an optical system according to an embodiment of the present invention having such embodiment values. FIGS. 6A and 6B illustrate MTF characteristics for a long distance and a short distance, respectively.

Referring to FIGS. 6A and 6B, f0 represents an MTF variation of spatial frequency per millimeter in case a distance from a center of a lens is zero, and f1, f2, f3, f4 represent MTF variations of spatial frequency per millimeter for cases of 0.6, 0.8, 1.0, 1.0 fields, respectively. Further, T and R represent MTFs on a tangential circle and a radial circle, respectively.

Here, the MTF depends on spatial frequency of cycles per millimeter and is defined between maximum and minimum intensities of a ray by formula 2 as follows:

$$MTF = \frac{Max - Min}{Max + Min} \quad \text{Formula 2}$$

That is, if an MTF is 1, a resolution is ideal and a resolution falls down as an MTF is reduced.

Figure 3A:
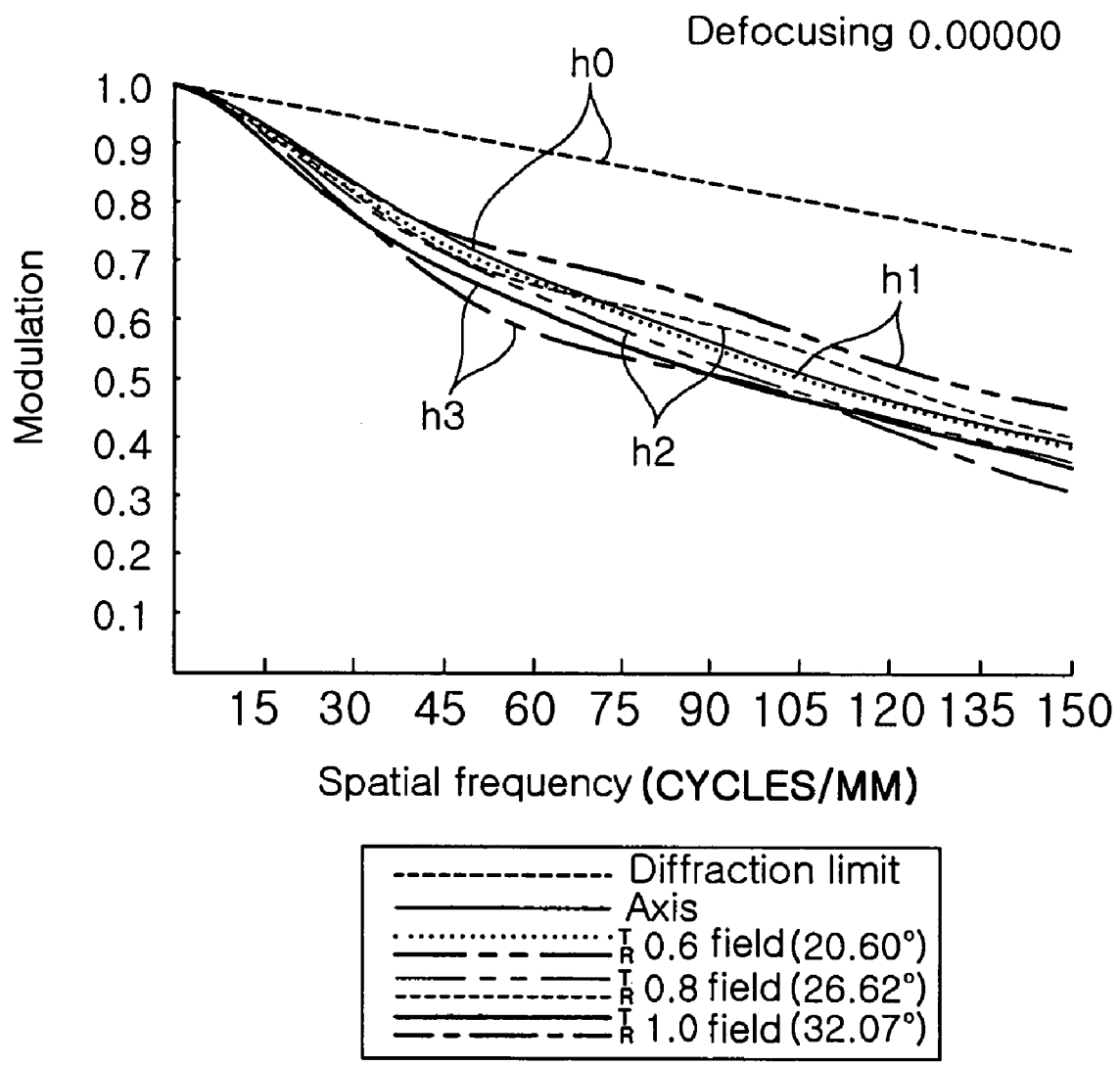
FIGS. 3A and 3B are graphs illustrating MTF characteristics for a long distance and a short distance in an optical system of the related art.
Figure 3B:
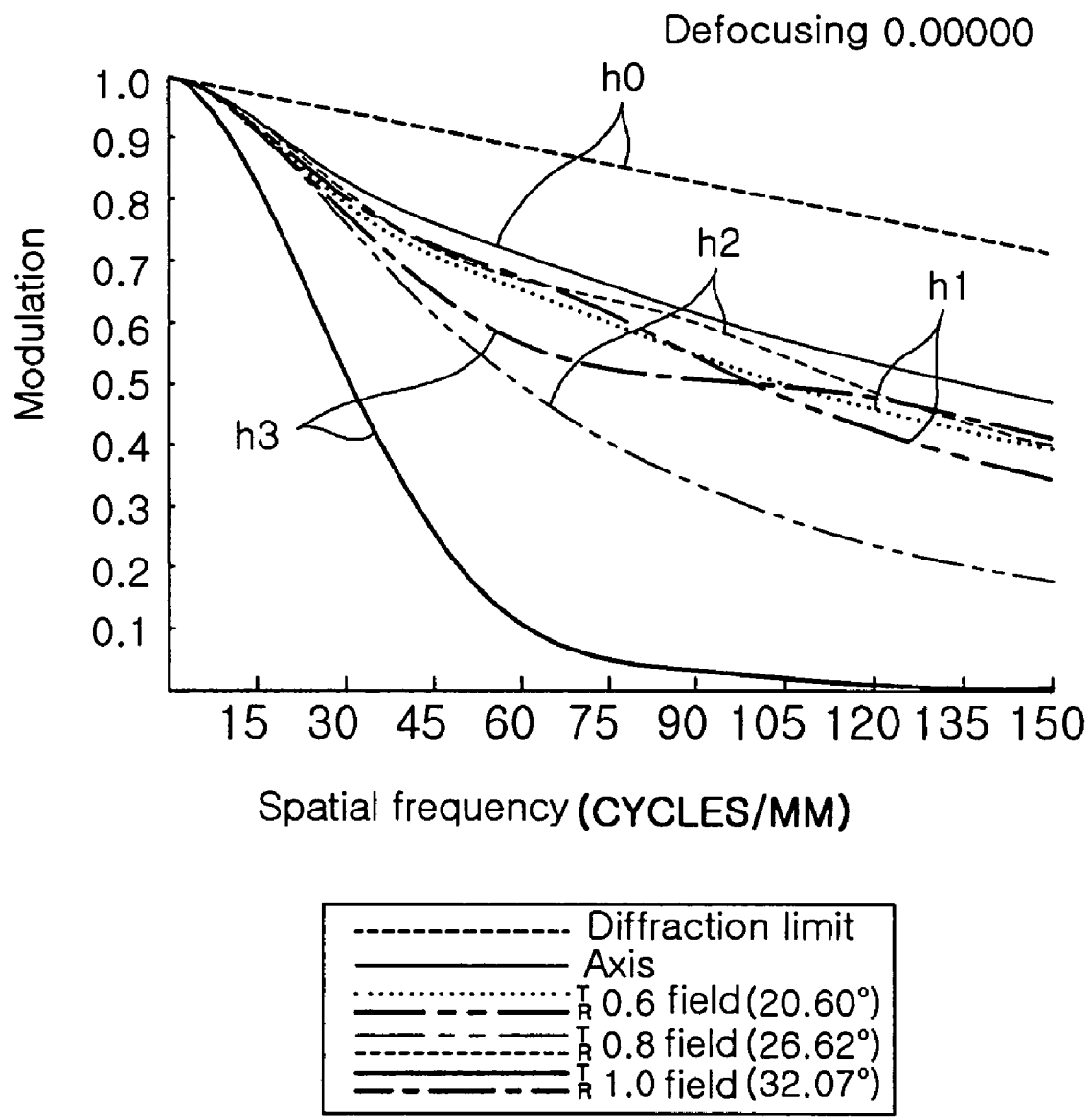

In the meantime, FIGS. 3A and 3B are graphs illustrating MTF characteristics for a long distance and a short distance, respectively, when a liquid lens is mounted on the second or the third lens group.

Referring to FIGS. 3A and 3B, h0 represents an MTF variation of spatial frequency per millimeter in case a distance from a center of a lens is zero, and h1, h2, h3 represent MTF variations of spatial frequency per millimeter for cases of 0.6, 0.8, 1.0 fields, respectively. On the whole, in case a distance from a center of a lens is zero (h0), an MTF is highest, and in case of 1.0 field (h3), an MTF is lowest regardless of variations in the spatial frequency.

Examination on an MTF graph in FIG. 3 shows that an MTF drastically decreases as a spatial frequency value increases and as an MTF value decreases, a resolution of an image realized by a projection optical system decreases.

Particularly, as shown in an MTF graph for a short distance, of FIG. 3B, in case of 1.0 field, an MTF value on a tangential circle drastically decreases and a resolution decreases greatly.

To solve such problems, introduction of a liquid lens 120 to the first lens group can prevent an MTF value at a 1.0 field on a tangential circle from drastically decreasing as shown in FIG. 6B.

That is, in case a liquid lens is mounted on the second or the third lens group as shown in FIG. 3, a resolution drastically decreases at the vicinity of a 1.0 field. To solve such problem, a liquid lens may be mounted on the first lens group.

Therefore, an auto-focusing optical system according to an embodiment of the present invention can realize a high contrast ratio and a high resolution.

As described above, thanks to an auto-focusing optical system including a liquid lens according to the present invention, not only a manufacturing in a small size is possible but also a high resolution can be obtained.

Particularly, it is possible to maximize an efficiency of an optical system and shorten a length of the whole optical system by adding the liquid lens to the first lens group LG1 and enhancing the first lens group's power. Therefore, the optical system can be readily applied to a very small-sized camera module such as a camera phone.

Further, since the present invention uses a liquid lens, a power consumption is small compared to a mechanical operation type of the related art. Furthermore, since a close shot is possible, the present invention shows an advantage for code service, and further, can be applied to a scan function.

It will be apparent to those skilled in the art that various modifications and variations can be made in the present invention. Thus, it is intended that the present invention covers the modifications and variations of this invention provided they come within the scope of the appended claims and their equivalents.

Particularly, though the present invention has been described mainly for an auto-focusing optical system, it can be readily applied to an optical system including a camera module having an optical zoom function.

What is claimed is:

1. An auto-focusing optical system comprising, sequentially from an object side:

a first lens group having a plus optical power, the first lens group including a liquid lens in which a curvature of a boundary surface formed between different liquids included in an inside is varied depending on an applied voltage so that the boundary surface performs a function of a lens' surface, and an aspherical lens having an aspherical surface formed on at least one refractive surface thereof;

a second lens group having a plus optical power, and including an aspherical lens having an aspherical surface formed on at least one refractive surface thereof;

a third lens group a minus optical power, and including an aspherical lens having an aspherical surface formed on at least one refractive surface thereof; and wherein the curvature of the boundary surface of the liquid lens is varied so that an auto-focusing is performed.

2. The system of claim 1, wherein a refraction power of the liquid lens satisfies the following Equation 1:

$$-7 < D < 35 \quad \text{Equation 1,}$$

wherein D is refraction power of a surface of the liquid lens whose curvature is varied (unit: diopter).

3. The system of claim 2, wherein an optical axial direction measure of the whole lens group satisfies the following Equation 2:

$$oal/f < 2.0 \quad \text{Equation 2,}$$

wherein oal is distance between an aperture stop up to an image plane, and f is composite focal length of the whole lens.

4. The system of claim 2, wherein a power of the first lens group satisfies the following Equation 3:

$$0.85 < |f1/f| < 1.5 \quad \text{Equation 3,}$$

wherein f1 is composite focal length of the first lens group.

5. The system of claim 4, wherein a power of the third lens group satisfies the following Equation 4:

$$2.0 < |f3/f| < 5.5 \quad \text{Equation 4,}$$

wherein f3 is composite focal length of the third lens group.

6. The system of claim 1, wherein the first lens group comprises, sequentially from an object side:
- a first lens that corresponds to a cover surface of the liquid lens;
- a second lens including the liquid lens; and
- a third lens that corresponds to an upper cover surface of the liquid lens.

7. The system of claim 6, further comprising an aperture stop arranged most closely to the object side.

8. The system of claim 1, further comprising an aperture stop arranged most closely to the object side.

* * * * *